(12) United States Patent
Van Der Heijde et al.

(10) Patent No.: US 7,637,608 B2
(45) Date of Patent: Dec. 29, 2009

(54) GLASSES

(75) Inventors: Gerrit Ludolph Van Der Heijde, Amsterdam (NL); Willem Peter Louwerse, Hilversum (NL)

(73) Assignee: Stichting Right on Sight, Veessen (NL)

( * ) Notice: Subject to any disclaimer, the term of this patent is extended or adjusted under 35 U.S.C. 154(b) by 0 days.

(21) Appl. No.: 12/259,127

(22) Filed: Oct. 27, 2008

(65) Prior Publication Data

US 2009/0122254 A1    May 14, 2009

Related U.S. Application Data

(63) Continuation-in-part of application No. PCT/NL2007/050176, filed on Apr. 23, 2007.

(30) Foreign Application Priority Data

Apr. 27, 2006   (NL) .................................. 1031704

(51) Int. Cl.
G02C 9/02     (2006.01)
(52) U.S. Cl. .......................................... 351/59; 351/41
(58) Field of Classification Search ................... 351/59, 351/57, 54, 55, 158, 41
See application file for complete search history.

(56) References Cited

U.S. PATENT DOCUMENTS

| 1,206,457 | A | * | 11/1916 | Mills ........................... 351/57 |
| 3,305,294 | A | | 2/1967 | Alvarez |
| 5,162,824 | A | | 11/1992 | Klemka |
| 5,644,374 | A | | 7/1997 | Mukaiyama et al. |
| 7,175,274 | B1 | * | 2/2007 | Markson ....................... 351/59 |
| 2007/0091253 | A1 | * | 4/2007 | Chao ........................... 351/59 |

FOREIGN PATENT DOCUMENTS

| EP | 1433415 | 8/2004 |
| EP | 1491937 | 9/2007 |

\* cited by examiner

*Primary Examiner*—Hung X Dang
(74) *Attorney, Agent, or Firm*—Jeffrey D. Myers; Peacock Myers, P.C.

(57) ABSTRACT

Glasses, comprising a frame and a lens system for the correction of defective vision, which comprises at least one pair of lenses formed by a first lens and a second lens, which first and second lens, viewed in the path of vision, are disposed one behind the other and are mutually adjustable for realizing a desired degree of correction of vision, wherein the first lens is position-invariantly received in the frame, and the second lens can be moved longitudinally along the first lens.

8 Claims, 4 Drawing Sheets

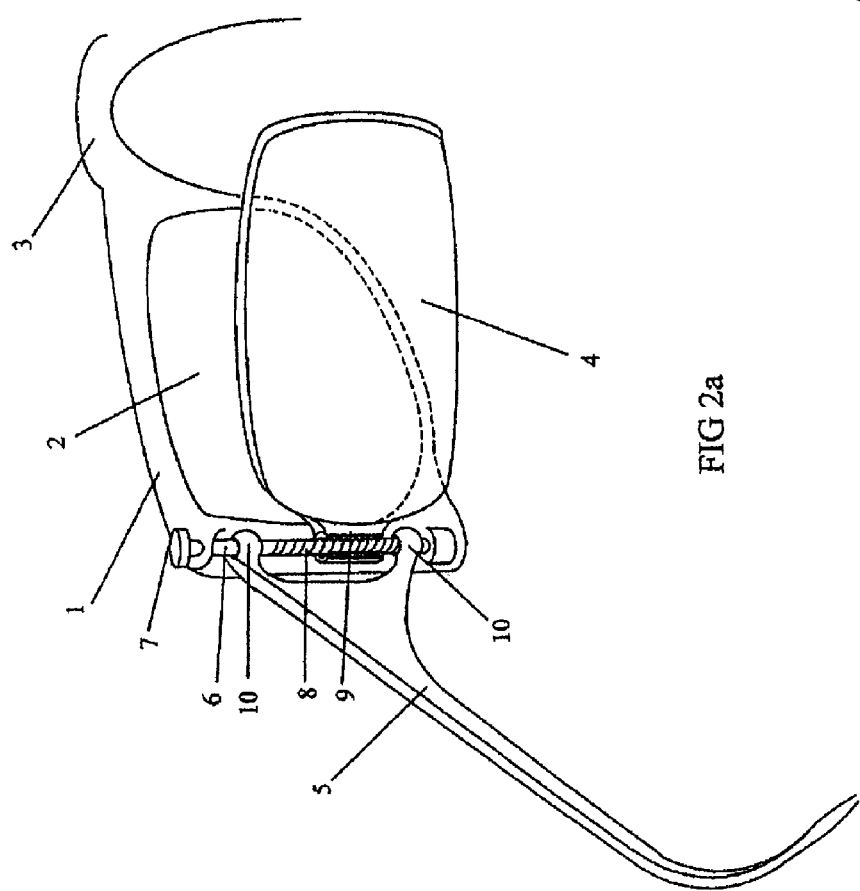
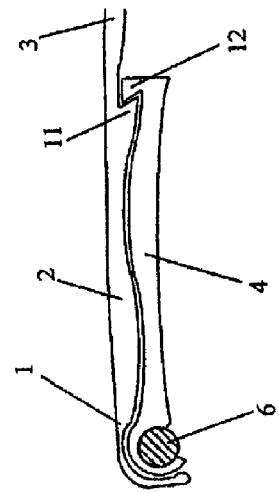
FIG 2a
FIG 2b

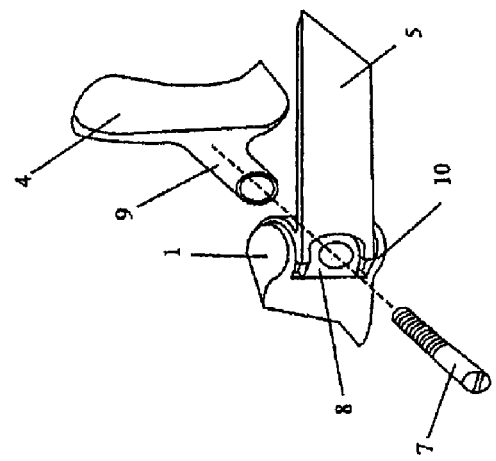
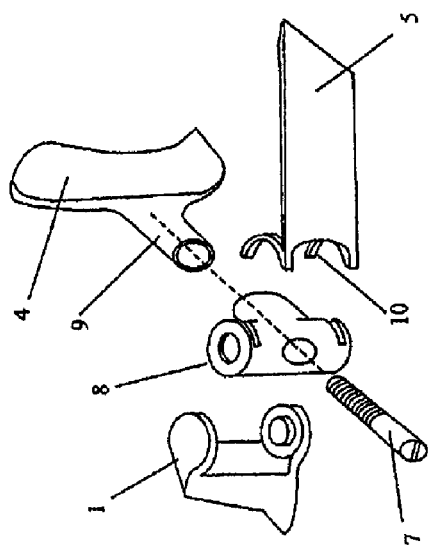
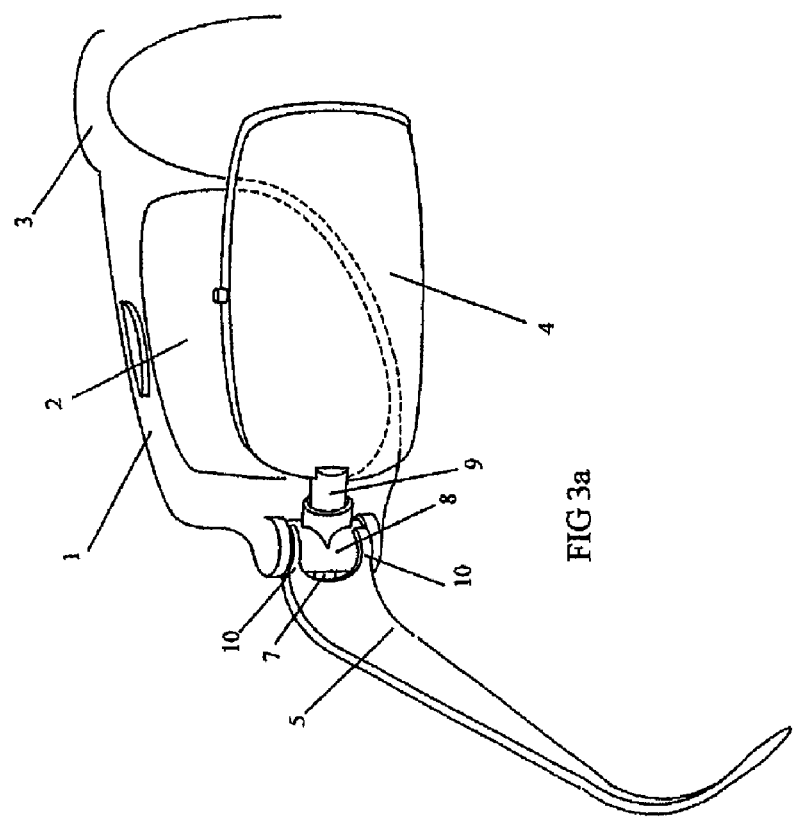
FIG 3b
FIG 3c
FIG 3a

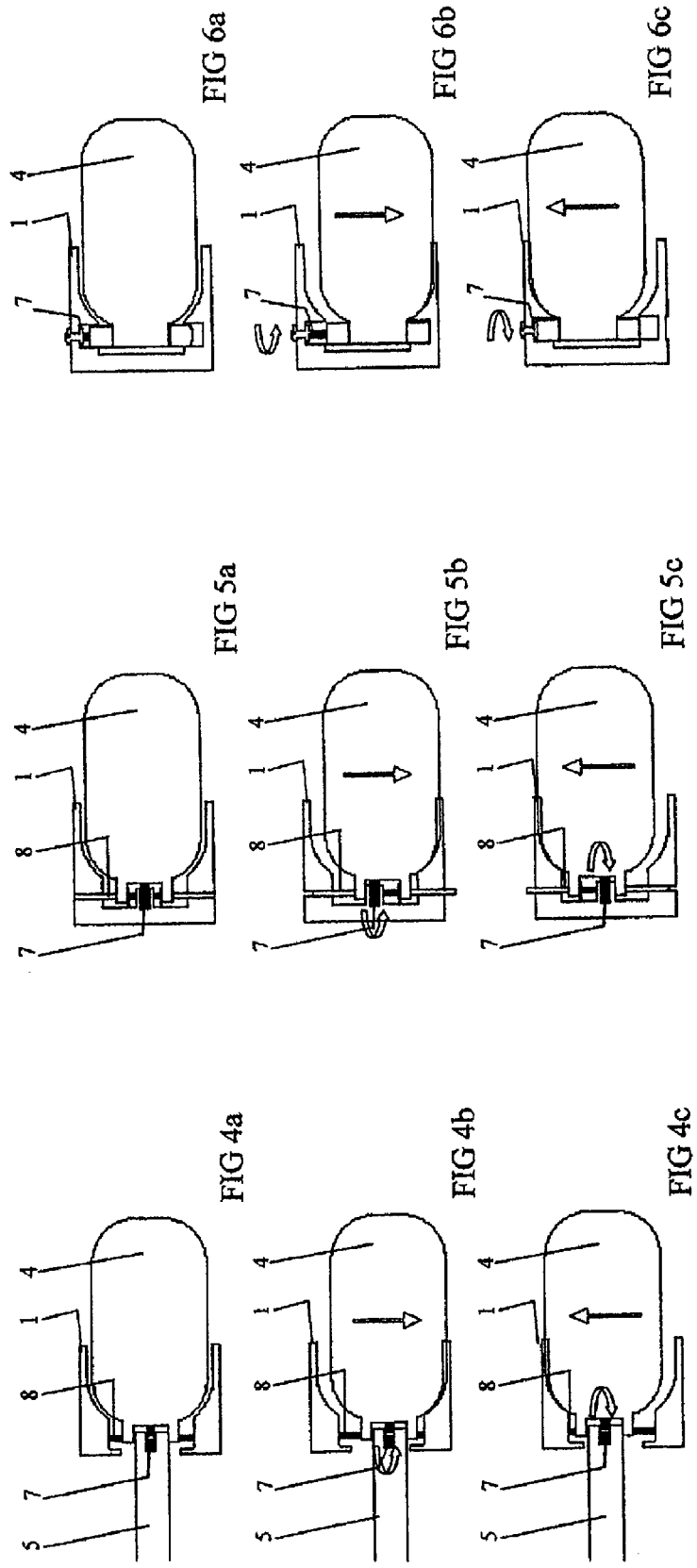

GLASSES

CROSS-REFERENCE TO RELATED APPLICATIONS

This application is a continuation-in-part application of International Patent Application Ser. No. PCT/NL2007/050176, entitled "GLASSES", to Vereniging voor Christelijk Hoger Onderwijs, Wetenschappelijk Onderzoek en Patientenzorg, filed on Apr. 23, 2007, and the specification and claims thereof are incorporated herein by reference.

This application claims priority to and the benefit of the filing of Netherlands Patent Application Ser. No. 1031704, entitled "GLASSES" ("UITTREKSEL"), filed on Apr. 27, 2006, and the specification and claims thereof are incorporated herein by reference.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

1. Field of the Invention (Technical Field)

The invention relates to glasses, comprising a frame and a lens system for the correction of defective vision, which comprises at least one pair of lenses formed by a first lens and a second lens, which first and second lens, viewed in the path of vision, are disposed one behind the other and are mutually adjustable for realising a desired degree of correction of vision.

2. Description of Related Art

Glasses with such a lens system are known, for example, from U.S. Pat. No. 5,644,374.

BRIEF SUMMARY OF THE INVENTION

The object of the invention is to provide such glasses wherein the adjustment for realising the desired degree of correction of vision can be performed very simply, and can easily be modified as required. A further object of the invention is to provide such glasses that require no provisions for correcting the pupillary distance between the lenses of the glasses. Still another object of the invention is to provide such glasses that are easy to clean and with which further advantages are to be obtained, as will become apparent hereinafter.

The glasses according to the invention are characterized by one or several of the appended claims.

In a first aspect of the invention, the glasses are characterized in that the first lens is position-invariantly received in the frame, and the second lens can be moved longitudinally along the first lens. This endows the embodiment of the glasses according to the invention with robustness, while the glasses are also easily adjustable by longitudinally moving the second lens along the first lens.

In a further aspect of the invention, the glasses are characterized in that the second lens can be moved along the first lens in a direction perpendicular to a bridge of the frame.

This affords the advantage that for both eyes of the user, the pupillary distance of the lenses is invariable and does not change when adjusting the second lens in relation to the first lens.

To simplify the use of the glasses according to the invention, they are preferably characterized in that for this purpose an adjusting member is provided for the second lens.

In still another aspect of the invention, the glasses are characterized in that the second lens can be swung away from the first lens. This is a simple way to facilitate cleaning of the two lenses. For the sake of completeness it is remarked that the first lens may be in front of the second lens but this may also be the other way around.

The ability to swing the second lens away, may be realised simply by embodying the glasses such that the second lens is hingingly coupled with the frame.

An elegant and advantageous embodiment of the glasses may be realised by embodying the same such that the hinging coupling of the second lens to the frame is integrated with the adjusting member for the second lens.

The advantages gained through simplicity of construction and saving of costs by limiting the number of components to be used, is further advanced by embodying the glasses such that the hinging coupling is designed to simultaneously couple a temple to the frame.

The glasses are further suitably provided with a control element for adjusting and/or moving the second lens, wherein with a first preferred embodiment the control element is integrated in a temple.

In a second preferred embodiment, the above-mentioned control element is integrated in the frame.

The control element may be provided at various positions. In general, however, it is convenient for the control element to be positioned at the top of the frame.

In still another aspect of the invention, the glasses are characterized in that a locking mechanism is provided for locking the second lens in a ready for use position. The only purpose of this locking mechanism is to keep the second lens positioned against the first lens fitted in the frame. Locking does not stop the second lens from being moved longitudinally in relation to the first lens for the purpose of focussing.

Locking can be realised simply by means of two engaging snap rims provided on the frame and on the second lens.

Hereinafter the invention will be further elucidated with reference to the drawing in which some non-limiting exemplary examples of the glasses according to the invention are shown.

BRIEF DESCRIPTION OF THE SEVERAL VIEWS OF THE DRAWINGS

The drawing shows in:

FIG. 2a and FIG. 2b, a second embodiment of the glasses according to the invention in a rear view and a top view;

Figure 1B:
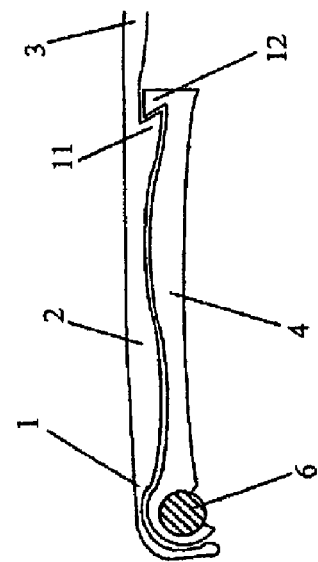
FIG. 1a and FIG. 1b, a first embodiment of the glasses according to the invention in a rear view and top view, respectively.

The FIGS. 3a-3c, a third embodiment of the glasses according to the invention in a rear view and as a detail, respectively, of the coupling frame-temple-lens;

The FIGS. 4a-4c, a portion of a following embodiment of the glasses according to the invention, showing in detail a first embodiment of an adjusting member;

The FIGS. 5a-5c, a portion of a further embodiment of the glasses according to the invention, showing a second embodiment of an adjusting member in detail; and FIGS. 6a-6c still a further embodiment of the glasses according to the invention, showing a third embodiment of the adjusting member in detail.

Similar components in the figures carry identical reference numerals.

With reference first to the FIGS. 1a, 1b, 2a and 2b, glasses according to the invention are shown in a first and second embodiment, respectively.

DETAILED DESCRIPTION OF THE INVENTION

Figure 1A:
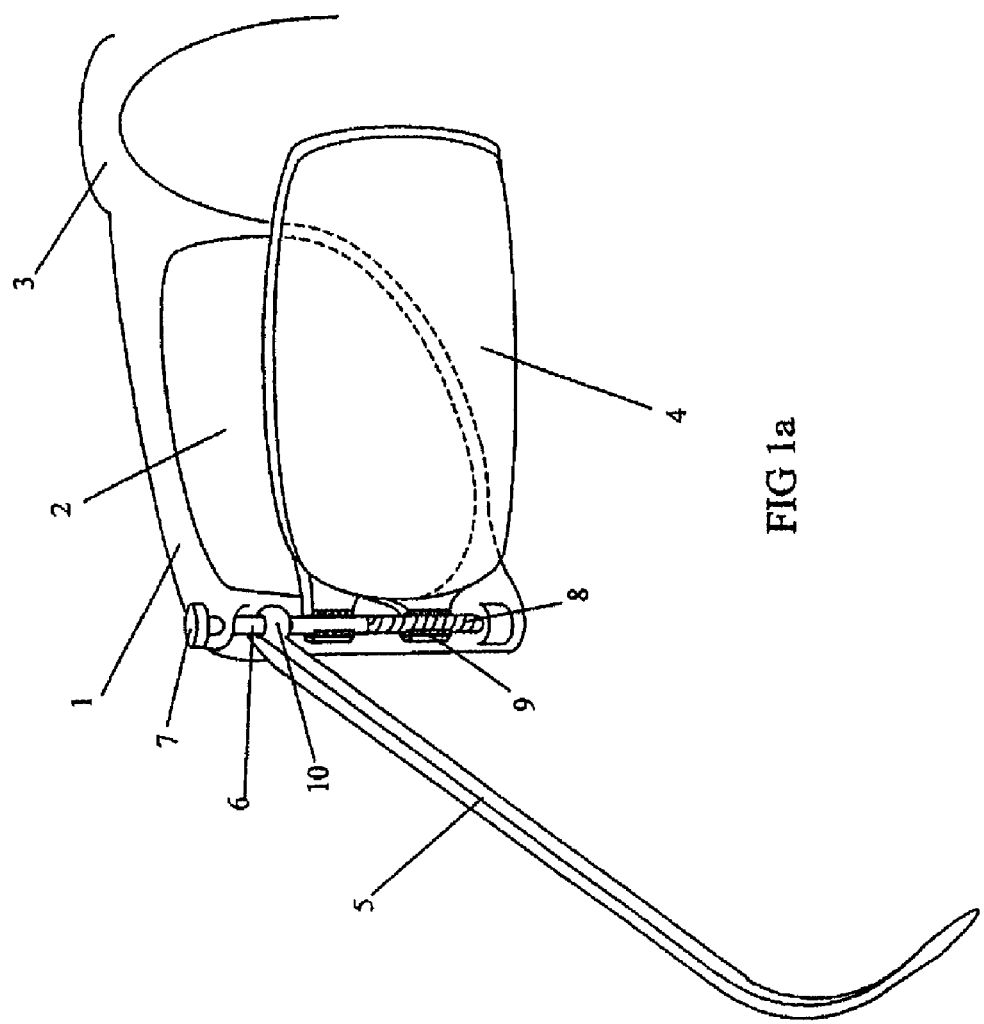

The embodiment shown in FIG. 1a/1b as well as the embodiment shown in FIG. 2a/2b comprises a frame 1 and a lens system for the correction of defective vision, comprising at least one pair of lenses formed by a first lens 2 and second lens 4, which first lens 2 and second lens 4, viewed in the path of vision, are disposed one behind the other and are mutually adjustable for realising a desired degree of correction of vision.

In both embodiments the first lens 2 is fitted position-invariantly into the frame 1, and the second lens 4 is longitudinally movable along the first lens 2. To this end the second lens 4 is movable along the first lens 2, preferably in a direction perpendicular in relation to the bridge 3 of the frame b, which achieves that the pupillary distance of the lenses for both eyes of the user of the glasses according to the invention, remains invariable. When the frame 1 is in the "horizontal position", the second lens 4 is moved in the "vertical direction".

For the purpose of adjusting the second lens 4, the glasses are equipped with an adjusting member 8, 9 for the second lens 4. In addition, the second lens 4 can be swung away from the first lens 2 and, for this purpose, possess a hinging coupling 8, 9 with the frame 1.

FIG. 3a shows a variation on the above-explained embodiments of FIGS. 1a/1b and 2a/2b. FIG. 3a shows an embodiment, wherein the second lens 4 is adjustable along the first lens 2 in a direction parallel to the bridge 3. Simply expressed: when the frame 1 is in the "horizontal" position, the second lens 4 is likewise adjusted in the "horizontal" direction.

Adjustment of the second lens 4 is realised by means of adjusting a bolt 9 coupled with a second lens 4, and extending into the hinging T-shaped coupling piece 8. This embodiment also allows the second lens 4 to be swung away from the first lens 2, which is convenient for cleaning the lenses.

As shown by both embodiments of the FIGS. 1a/1b and 2a/2b as well as by the embodiment of FIG. 3a, the hinging coupling 8, 9 of the second lens 4 is integrated in the frame 1 via the adjusting member 8, 9 for the second lens 4. This is actually not a requirement but it is advantageous with respect to the simplicity of the glasses' construction and to reducing the number of components. As shown by the various embodiments, it is in this regard further advantageous for the hinging coupling 8, 9 also to be designed for coupling a temple 5 to the frame 1.

The two embodiments shown in FIG. 1a/1b and FIG. 2a/2b and the embodiment of FIG. 3a (see in particular the detail in FIGS. 3b and 3c) further show that a control element 7 is provided for adjusting or moving the second lens 4.

The FIGS. 4a-4c show that the control element 7 may be integrated in a temple 5 such that, when the second lens 4 is moved in relation to the lens fitted in frame 1, this second lens 4, together with the temple 51 is adjusted in height in relation to the frame 1.

FIG. 4a shows the adjustment at an optical correction of −3.5 dioptres, FIG. 4b at −6 dioptres and FIG. 4c at −1 dioptre.

The FIGS. 5a-5c show an embodiment wherein the operating element 7 is integrated in the frame 1. In this embodiment, the temple 5 is fixed in relation to the frame 1 and, when operating the operating element 7, only the second lens 4 is adjusted in height in relation to the frame 1 and the first lens invariantly fitted therein.

FIG. 5a shows an adjustment relating to −3.5 dioptres, FIG. 5b shows the adjustment of the second lens 4 at −6 dioptres, while FIG. 5c shows the adjustment of the second lens 4 at −1 dioptre.

Correspondingly, the FIGS. 6a-6c show still another embodiment for the adjustment of the second lens 4 in relation to the first lens that is fitted invariantly in the frame 1, wherein the operating element 7 is now provided at the top of the frame 1.

With reference to the FIGS. 1b and 2b it is further shown that the glasses are provided with a locking mechanism 11, 12 to, when the second lens 4 is in a ready-to-use position in relation to the first lens 2, fix that second lens 4. To this end the locking mechanism is suitably embodied with engaging snap-on rims 11, 12 provided on the frame 1 and on the second lens 4.

Given the above explanation it will be obvious to the person skilled in the art that it is possible to vary the glasses according to the invention in many ways without departing from the spirit of the invention or the protective scope merited by the appended claims.

With respect to the ability of the second lens to swing away it is, for example, feasible to embody it hingingly at the side of the bridge 3 of the frame 1.

It is also conceivable to embody the hinging coupling 8, 9 separate from the adjusting member with which the second lens is adjusted in relation to the first lens. It is also possible to provide the temple with a separate hinge by which it is coupled with the frame 1.

What is claimed is:

1. Glasses, comprising a frame and a lens system for the correction of defective vision, which comprises at least one pair of lenses formed by a first lens and a second lens which first and second lens, viewed in the path of vision, are disposed one behind the other and are mutually adjustable for realising a desired degree of correction of vision, wherein the first lens is position-invariantly received in the frame, and the second lens can be moved longitudinally along the first lens and that the second lens can be swung away from the first lens, wherein the second lens is hingingly coupled with the frame, wherein a locking mechanism is provided for locking the second lens in a read-for-use position, and wherein the locking mechanism is embodied with engaging snap-on rims provided on the frame and on the second lens.

2. Glasses according to claim 1, wherein the second lens can be moved along the first lens in a direction perpendicular to a bridge of the frame.

3. Glasses according to claim 1, wherein an adjusting member is provided for the second lens.

4. Glasses according to claim 1, wherein the hinging coupling of the second lens to the frame is integrated with the adjusting member for the second lens.

5. Glasses according to claim 1, wherein the hinging coupling is designed to simultaneously couple a temple to the frame.

6. Glasses according to claim 5, wherein an operating element for adjusting the second lens is integrated in the temple.

7. Glasses according to claim 1 wherein a control element is provided for adjusting the second lens that is integrated in the frame.

8. Glasses according to claim 7, wherein the control element to be positioned at the top of the frame.

* * * * *